(12) United States Patent
Giometti et al.

(10) Patent No.: US 6,460,686 B1
(45) Date of Patent: Oct. 8, 2002

(54) GLASS CONTAINER INSPECTION MACHINE

(75) Inventors: Stephen M. Giometti, Horseheads; Timothy W. Shay, Elmira; Henry F. Raupp, Freeville, all of NY (US); Zdenko Kuz, Steinhausen (CH)

(73) Assignee: Emhart Glass S.A., Cham (CH)

( * ) Notice: Subject to any disclaimer, the term of this patent is extended or adjusted under 35 U.S.C. 154(b) by 0 days.

(21) Appl. No.: 09/746,252

(22) Filed: Dec. 21, 2000

(51) Int. Cl.[7] .............................................. B65G 33/02
(52) U.S. Cl. ................................................. 198/467.1
(58) Field of Search ........................... 198/467.1, 459.3, 198/463.3, 625, 511

(56) References Cited

U.S. PATENT DOCUMENTS

| | | | | | |
|---|---|---|---|---|---|
| 2,854,125 | A | * | 9/1958 | Johnson | 198/467.1 |
| 4,462,516 | A | * | 7/1984 | Guerzoni | 198/427 |
| 5,392,928 | A | * | 2/1995 | Nickey et al. | 209/643 |
| 5,477,956 | A | * | 12/1995 | Liebhart | 198/459.4 |
| 5,697,489 | A | * | 12/1997 | Deonarine et al. | 198/480.1 |
| 5,718,030 | A | * | 2/1998 | Langmack et al. | 198/459.3 |
| 5,864,937 | A | * | 2/1999 | Cecil et al. | 198/467.1 |
| 6,308,817 | B1 | * | 10/2001 | Corniani et al. | 198/419.3 |

* cited by examiner

*Primary Examiner*—Douglas Hess
(74) *Attorney, Agent, or Firm*—Spencer T. Smith

(57) ABSTRACT

An infeed mechanism for a glass container inspection machine which will receive bottles on a linear conveyor and which has a support to which the infeed mechanism can be secured. The infeed mechanism has a timing cam and a frame is provided for supporting the timing cam at the bottom thereof which includes a first box like frame for rotatably supporting the timing cam at the bottom, a servo motor secured to and within the first box like frame, a vertically extending transmission supported by the first box like frame for transferring the output of the servo motor downwardly to the rotatable timing cam, a second frame, above the timing cam for supporting first frame for relative vertical displacement, and a mounting plate located vertically above the second frame for supporting the second frame for relative horizontal displacement transverse to the linear conveyor so that the infeed mechanism can be mounted by securing the mounting plate to a machine frame with the infeed mechanism above the linear conveyor.

1 Claim, 9 Drawing Sheets

GLASS CONTAINER INSPECTION MACHINE

The present invention relates to glass container inspection machines and more particularly to such machines which use star wheel conveyors.

BACKGROUND OF THE INVENTION

A conventional way of inspecting bottles which are being carried along a linear conveyor is to utilize a star wheel conveyor to remove the bottles from the linear conveyor, displace the bottles through a number of inspection stations, and than redeliver the inspected bottles to the linear conveyor.

An infeed mechanism which properly spaces the bottles is associated with the linear conveyor on the infeed side and an outfeed mechanism is associated with the linear conveyor on the outfeed side. Conventionally, either the linear conveyor or the inspection machine has to be taken apart establish the desired relationship between the infeed and outfeed mechanisms and the linear conveyor.

OBJECT OF THE INVENTION

It is accordingly an object of the present invention to provide a glass container inspection machine having a star wheel feeder and an infeed mechanism which can be completely suspended so that the machine can be installed in association with a linear conveyor without dismantling the infeed mechanism.

Other objects and advantages of the present invention will become apparent from the following portion of this specification and from the accompanying drawings which illustrate in accordance with the mandate of the patent statutes a presently preferred embodiment incorporating the principles of the invention.

BRIEF DESCRIPTION OF THE PREFERRED EMBODIMENT

Figure 1:
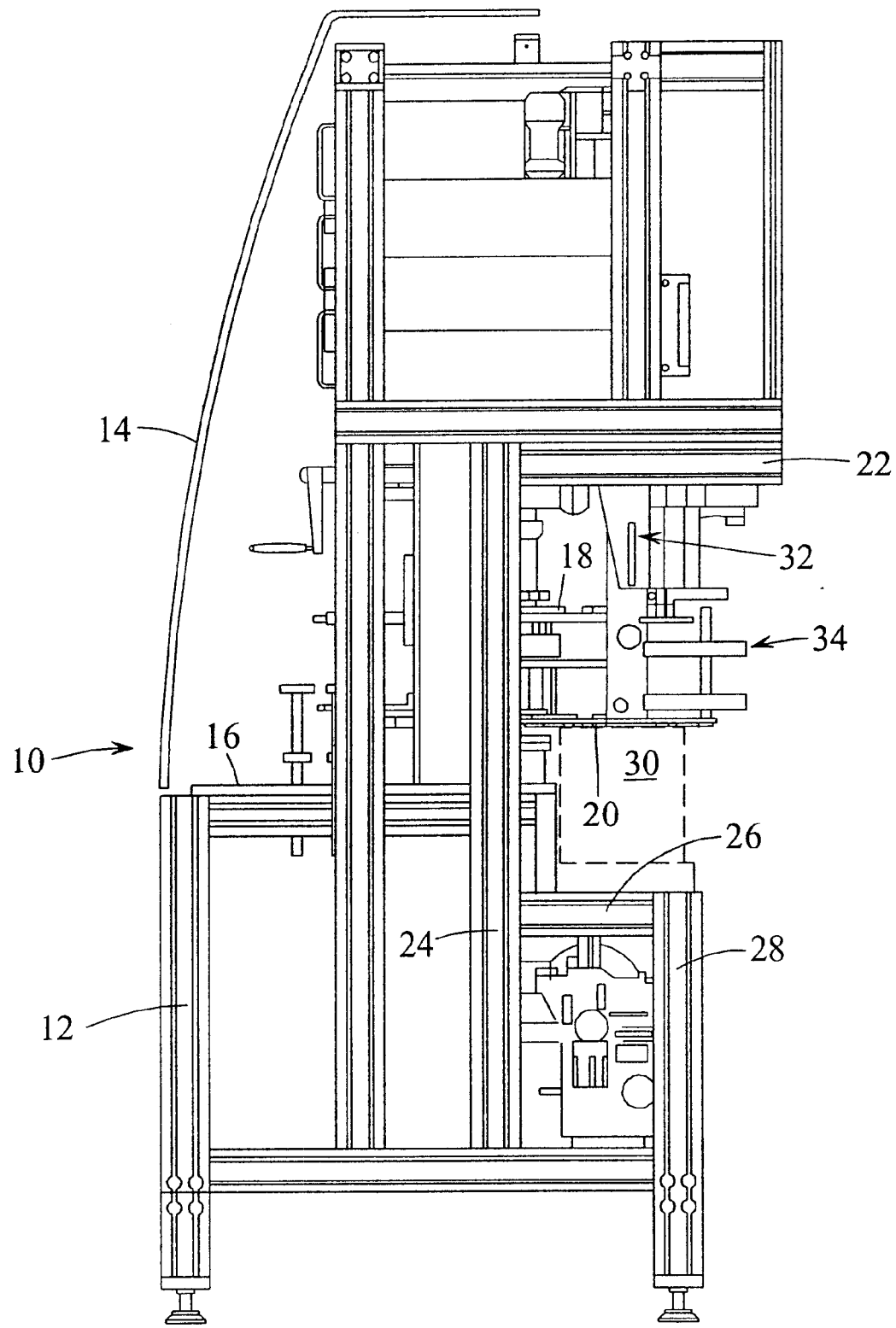
FIG. 1 is a side elevational view of a glass container inspection machine made in accordance with the teachings of the present invention.

FIG. 1 is a side elevational view of a glass container inspection machine 10 which has a tubular framework 12. A transparent front cover 14 closes the front of the machine. Defining the top work surface of the machine is a table 16 which is secured to the tubular frame. A shaft (not shown), to which upper 18 and lower 20 star wheels are clamped, is rotatably mounted on this table and extends downwardly through a hole in this plate where it is connected to a servo motor (also not shown) which can index the star wheels position to position.

An opening is defined in the back of the machine which in this view is defined by a horizontal top tube 22, a vertical front tube 24 and a horizontal bottom tube 26 which is continued by the top surface of vertical leg member 28. A dotted box 30 schematically shows the cross section of a linear conveyor which delivers bottles to the star wheel assembly and removes them from the machine when they are redeposited onto the conveyor. Above the linear conveyor are an infeed mechanism 32 (FIG. 3) and an outfeed mechanism 34 (FIG. 4). As shown the inspection machine can be placed in position relative to the linear conveyor without altering the linear conveyor or the inspection machine.

Figure 2:
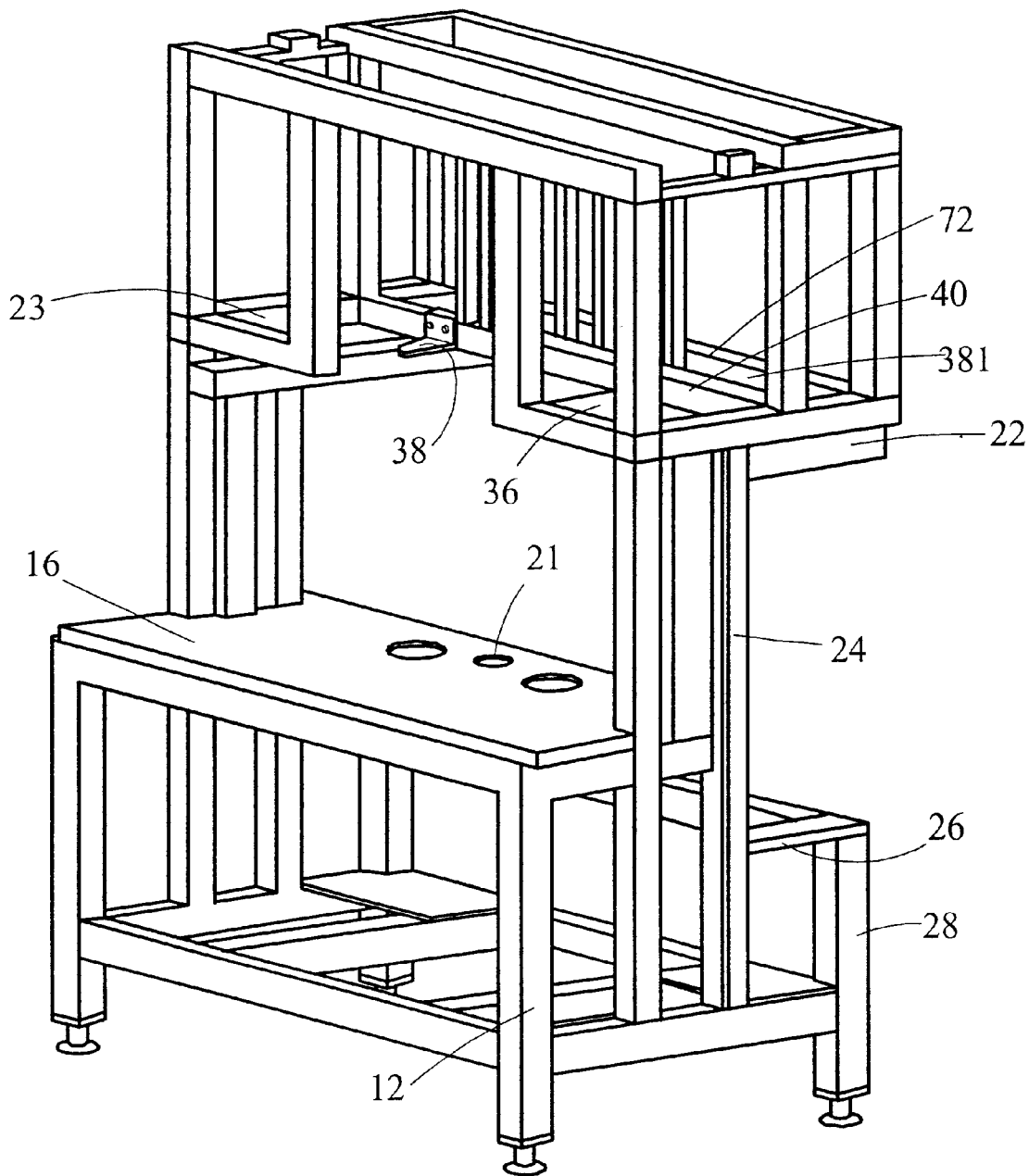
FIG. 2 is a front perspective view of the frame for the glass container inspection machine shown in FIG. 1.

FIG. 2 illustrates the tubular housing to which the table 16 has been placed and additionally shows the top mounting plate 36 of the infeed mechanism and the mounting bracket 38 of the outfeed mechanism secured to a cross bar 40 which interconnects the horizontal top tube 22, at the right side of the machine with the same tube 23, at the left of the machine.

Figure 3:
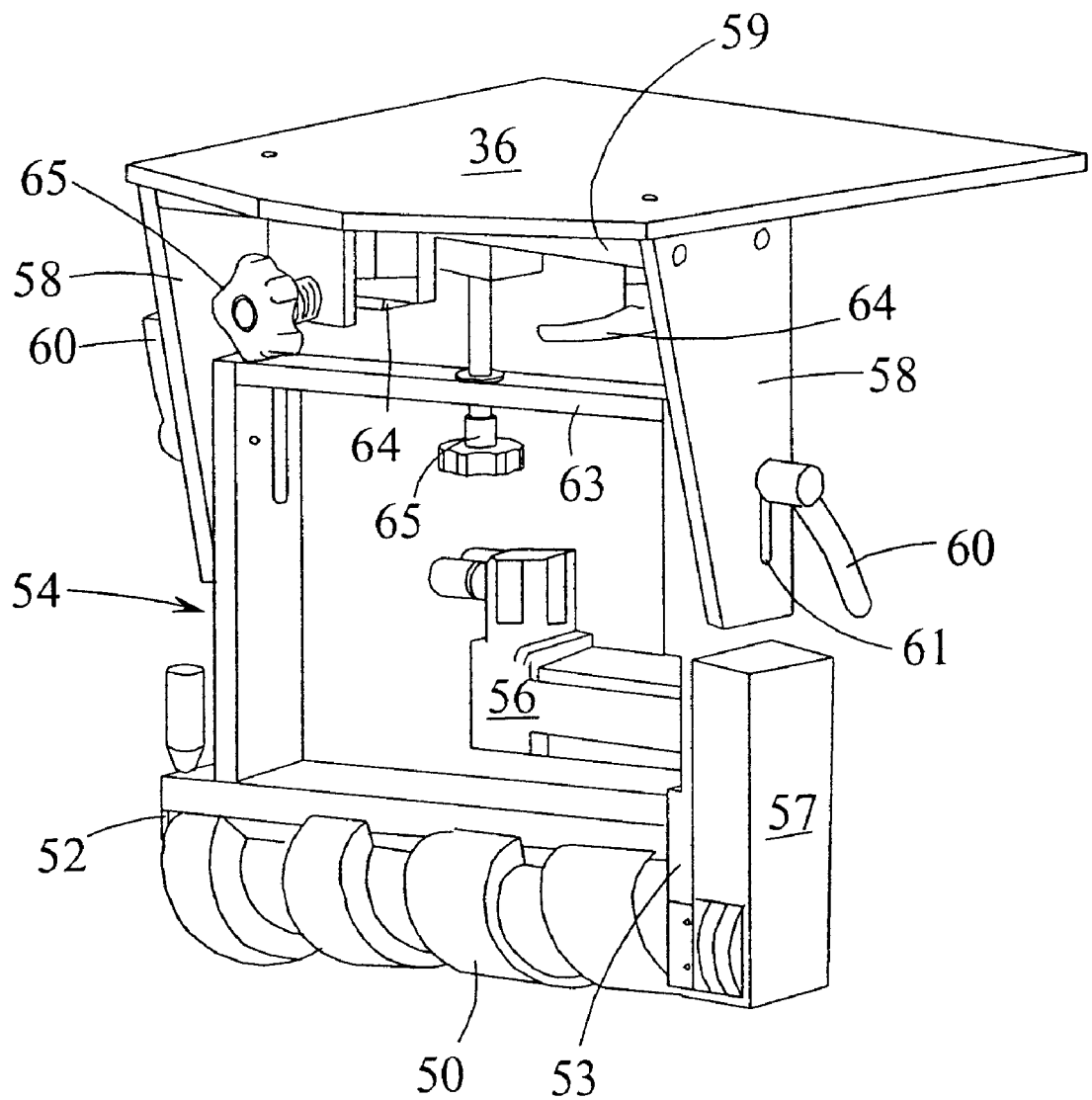
FIG. 3 is a perspective view of the infeed mechanism of the glass container inspection machine shown in FIG. 1.
Figure 4:
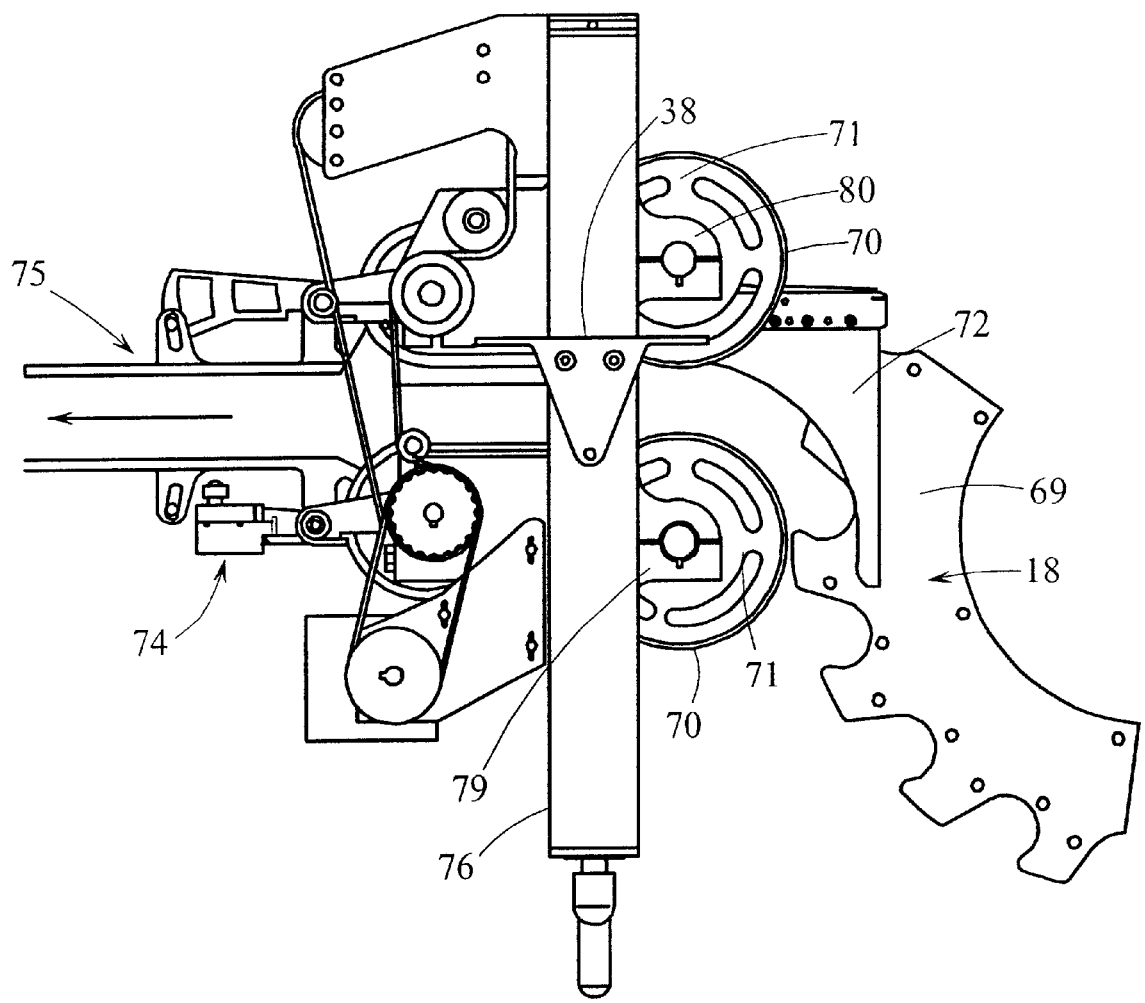
FIG. 4 is a top view of the outfeed mechanism of the glass container inspection machine shown in FIG. 1.
Figure 5:
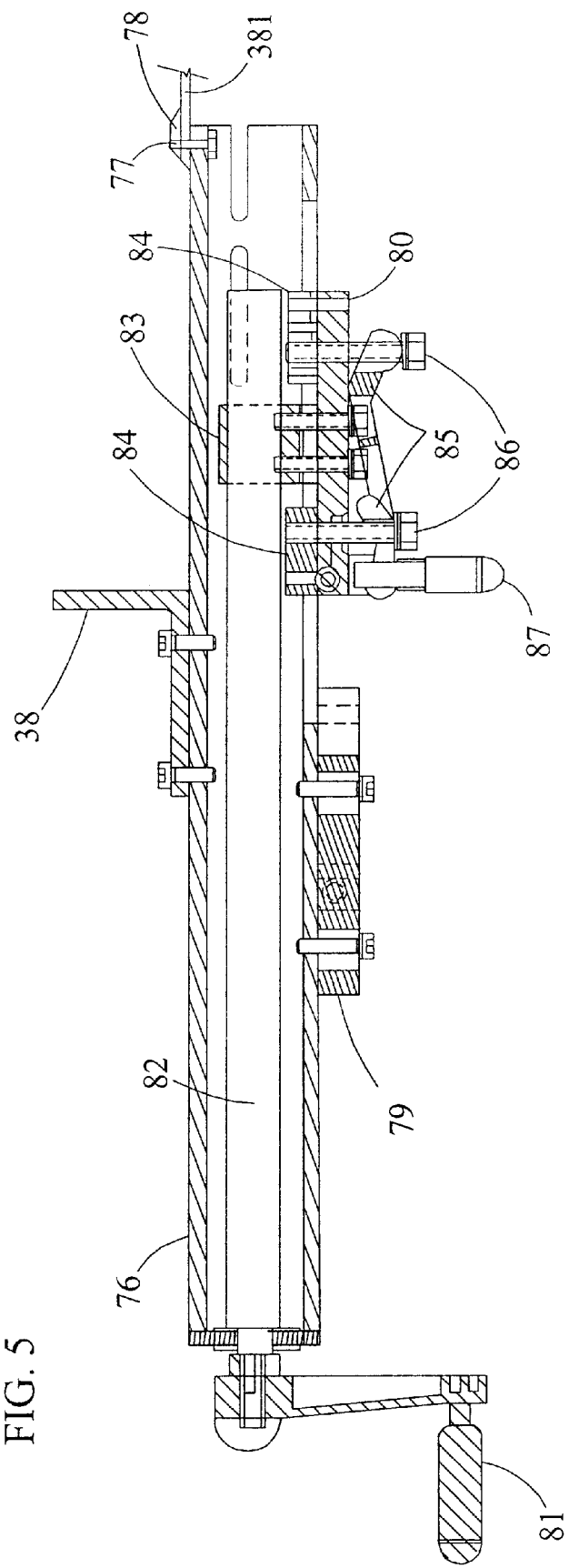
FIG. 5 is a side cross sectional view of the outfeed support and positioning mechanism.
Figure 6:
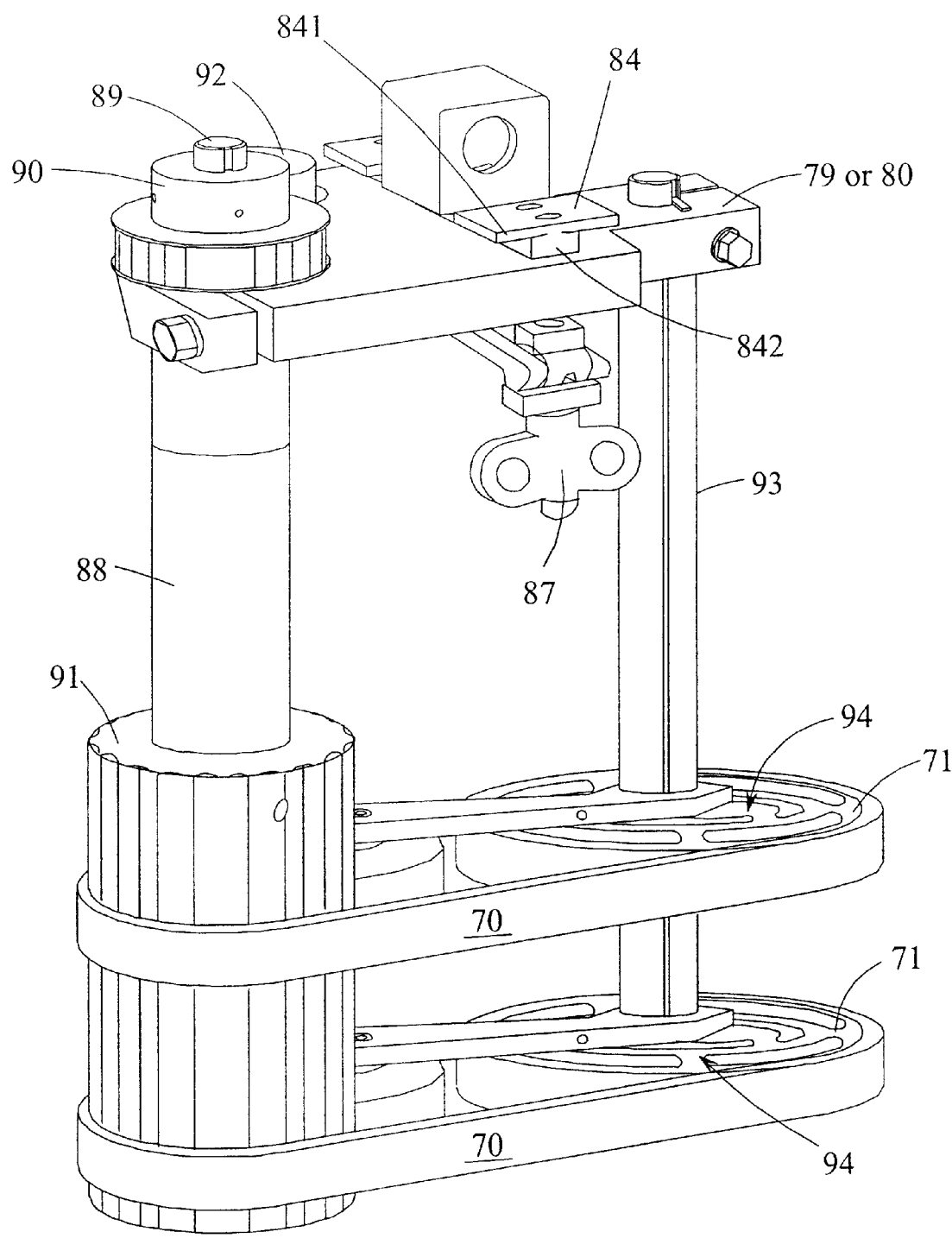
FIG. 6 is a perspective view of one of the belt feeder assemblies of the outfeed mechanism shown in FIG. 4.
Figure 7:
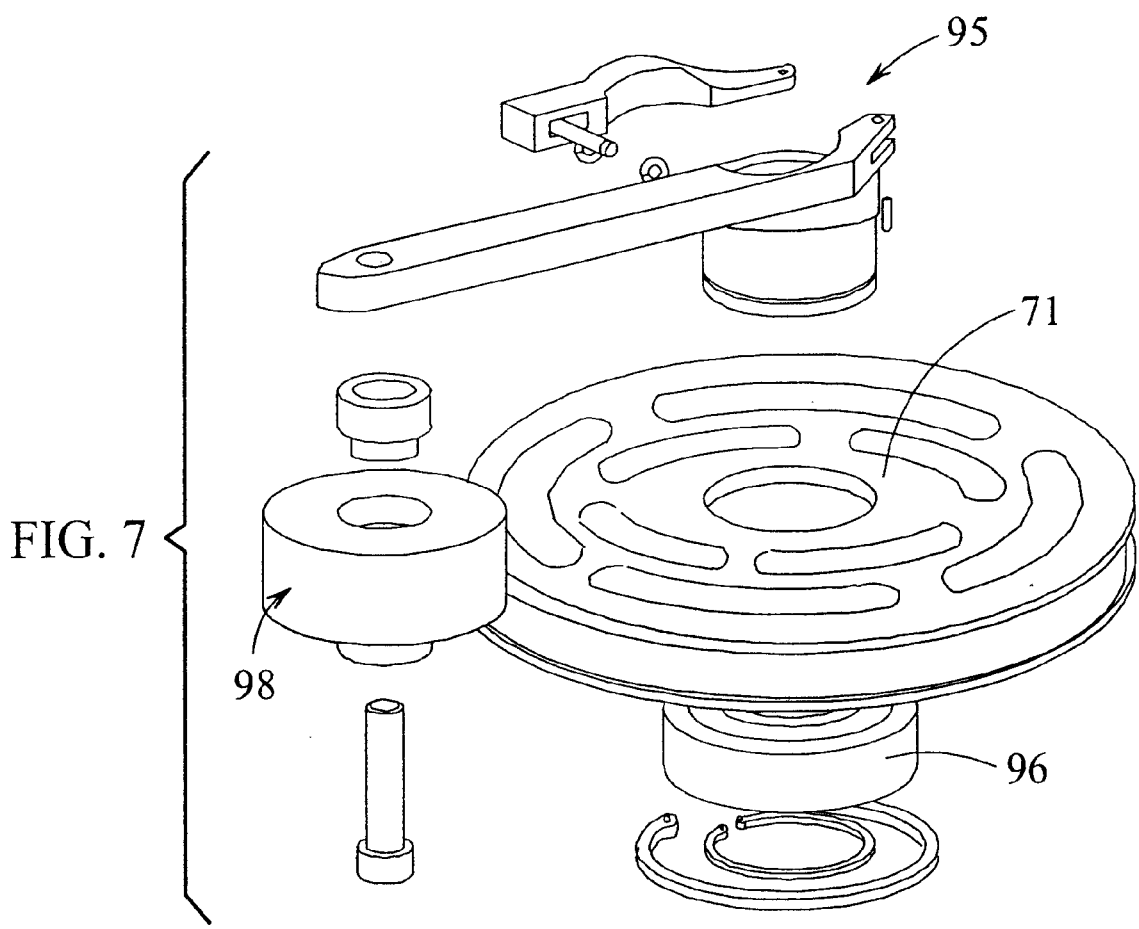
FIG. 7 is a perspective exploded view of one of the pick-off assemblies of the outfeed mechanism shown in FIGS. 4 and 5.
Figure 8:
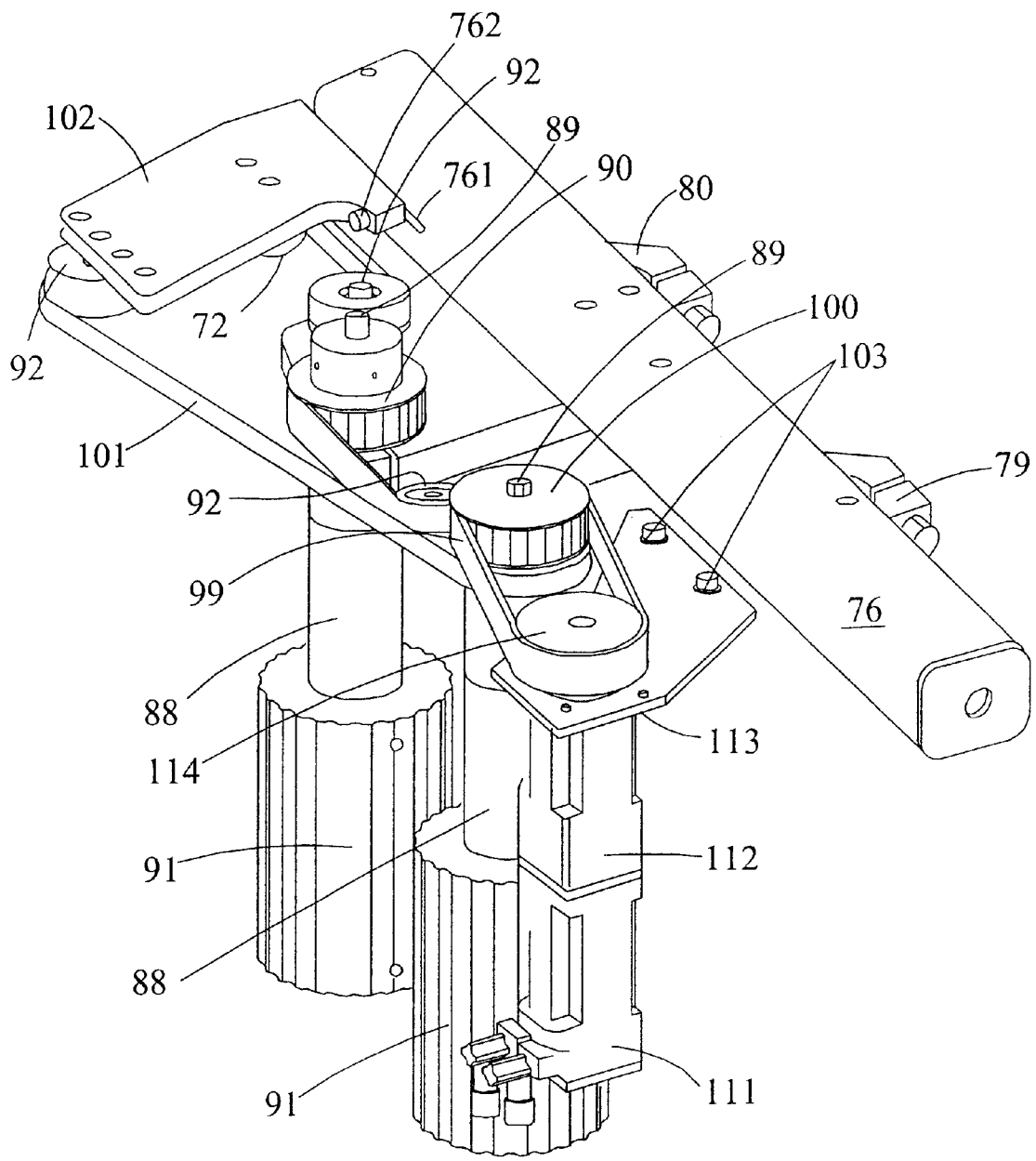
FIG. 8 is a perspective view of the belt feeder drive for the outfeed mechanism shown in FIGS. 4 and 5.
Figure 9:
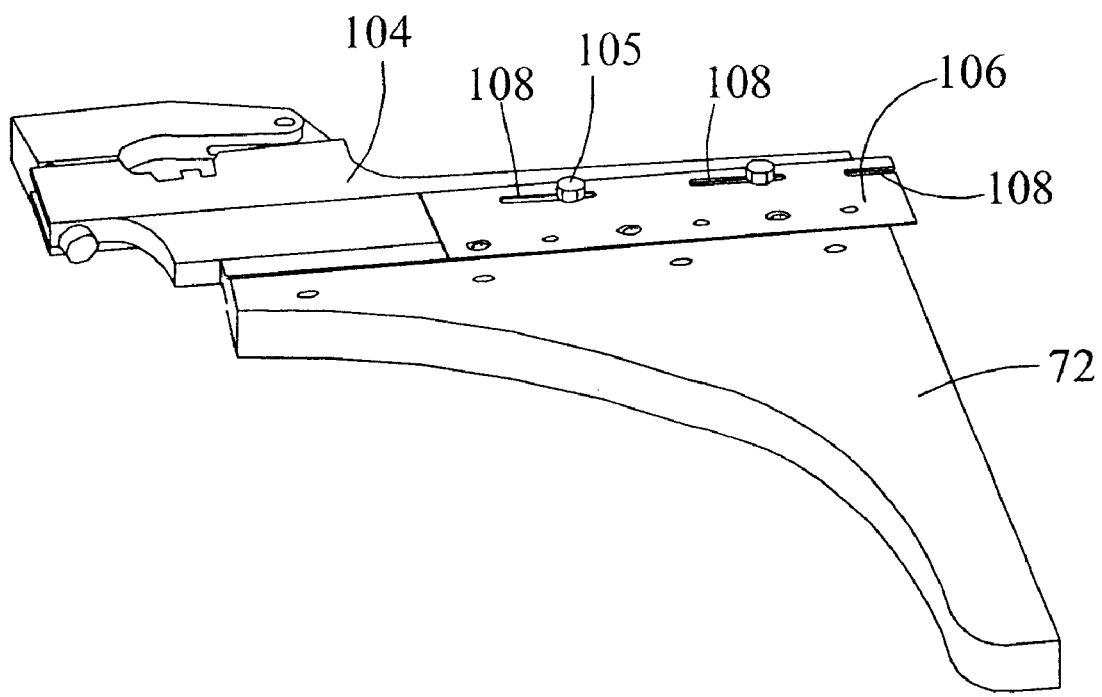
FIG. 9 is a perspective view of a stripper assembly of the outfeed mechanism shown in FIGS. 4 and 5.

The infeed mechanism is shown in FIG. 3. A timing cam 50, which engages each bottle and defines the appropriate spacing for the bottles to be picked up by the star wheel assembly, is rotatably supported between two downwardly projecting brackets 52,53 of a box-like frame 54. Mounted on the frame is a servomotor 56 which drives the timing cam via a suitable belt drive 57. The box-like frame is supported for vertical displacement on two depending hangars 58 which are secured to a cross bracket 59 and can be adjusted vertically by releasing clamps 60 and turning adjustment screw 62 which interconnects the top wall 63 of the box-like frame and the cross bracket, to displace slots 61 (only one shown) relative to the clamps. Similarly, the timing cam can be adjusted in and out by releasing clamps 64 and turning adjusting screw 65.

The outfeed mechanism is illustrated in FIGS. 4–9. In operation, the bottle is carried along a curved path by the star wheel feeder (one segment 69 of the upper star wheel 18 is shown) until it reaches position A where it comes into contact with a first pick-off assembly having one or more elastomer faced belts 70 which are moving with one or more pick-off wheels 71, as the pick-off wheels rotate in a counterclockwise mode. The elastomer faced belts, alone or in concert with the indexing star wheels, will act to roll a bottle along one or more strippers 72 until the bottle engages a second pick-off assembly also having a set (one or more) of elastomer faced belts 70 which are moving with a corresponding number of pick-off wheels 71 rotating in the clockwise direction. At this point the bottle is trapped between the elastomeric belts which will move the bottle in the direction of conveyor movement. Belt speed is selected so that the bottles can be released onto the moving conveyor. As bottles exit the belts, they will be guided by outfeed guide assemblies 74,75.

The support and positioning components for the outfeed assembly include a) a tubular support bracket 76 (FIGS. 5&6) which is secured to a forward cross bar 40 (FIG. 2) via the mounting bracket 38 and to a parallel rear cross bar 381 via a bolt 77 which extends through a hole in the tubular support, through a hole in the rear cross bar 381 and into a conventional tubular channel connector 78, b) a first mounting plate 79 which is bolted to the tubular support, c) a second mounting plate 80 which may be moved along the axis of support tube 76, d) a crank 81 which is used to rotate the center distance adjusting screw 82, e) a nut 83, fixed to the second mounting plate 80 which moves when the crank is operated, f) a pair of guides 84 with outwardly projecting flanges 841 (FIG. 3) for riding on the inner bottom surface of the tubular support and a downwardly projecting key 842 for riding in the linearly extending groove (not shown) in the bottom wall of the tubular support, and g) a pair of thumbscrew 87 operated clamping levers 85 which act in concert to clamp the second mounting plate 80 to the tubular support.

In operation, the thumbscrew is loosened so that the second mounting plate can be moved along the tubular support. Loosening the thumbscrew allows the clamping levers to move. As these levers move, the screws which pass through the second mount plate and are anchored in the guides 84 also move releasing the clamping force provided by the outward projecting flanges of the guides. The crank handle is then turned, thereby rotating the center distance adjusting screw. The rotation of the screw acts on the threads in the nut 83 to cause the second mount plate to move along the long axis of the support tube. The thumbscrew 87 can be tightened to maintain the second mount at its desired location.

There are a pair of belt feeder assemblies (FIG. 6) each including a component mount plate 79,80, a bearing mount tube 88 which is clamped in the component mount plate and which in turn supports a pair of outfeed belt drive bearings (not shown), an outfeed belt drive shaft 89, supported by the pair of outfeed drive bearings, on which are mounted a belt drive pulley 90 and an elongated driven pulley 91, one or more of the elastomer faced belts 70, an idler pulley assembly 92, and a pick-off wheel shaft 93 which is clamped in the component mount plate and which in turn supports a pick-off wheel assembly 94. The pick-off wheel assembly (FIG. 7) includes a hinged frame 95, a pick-off wheel bearing 96, a pick-off wheel 71, and a belt tensioning idler pulley assembly 98. The pick-off wheel assemblies 94 are positioned on the pick-off wheel support shaft 93 at a height appropriate to position the elastomer faced belts correctly, rotated until the belts are tensioned and then clamped to maintain this tension.

A belt feeder drive (FIG. 8), which drives both belt feeder assemblies, includes a servo motor 111, a speed reducing gear 112, a drive motor mounting plate 113, a timing belt pulley 114, a timing belt 99, a wide timing pulley 100, a serpentine timing belt tensioning plate 102 which supports a pair of idler pulley assemblies 92 and a serpentine belt 101. During belt feeder drive setup, the serpentine belts 101 are roughly positioned on their pulleys. The serpentine timing belt tensioning plate 102 which is interconnected with the tubular support 76 through an axial slot 761 can be moved towards the conveyor end of the support tube to tension the belt and secured in position with a screw 762. The drive motor mounting plate is moved away from the conveyor end of the support tube until the timing belt 99 is appropriately tensioned. Then three screws 103 (two shown) are tightened to fix the position of the drive motor mounting plate.

The stripper assembly includes a stripper mount clamp 104, a stripper 72, a stripper mount plate 106 which is secured to the stripper and which has a number of elongated slots 108, and hex cap screws 105 which pass through these slots into threaded holes in the stripper mount clamp to fix the stripper in a desired position. The stripper assemblies are mounted on the idler pulley support shaft 93.

What is claimed is:
1. An infeed mechanism for a glass container inspection machine which will receive bottles from a linear conveyor, space the bottles with the infeed mechanism, remove the bottles from the conveyor with a star wheel feeder for inspection and replace the bottles on the conveyor with an outfeed mechanism and which has a support to which the infeed mechanism can be secured comprising a timing cam, frame means for supporting said timing cam at the bottom thereof including
a first box like frame for rotatably supporting said timing cam at the bottom thereof,
a servomotor secured to and within said first box like frame,
vertically extending transmission means supported by said first box like frame for transferring the output of said servo motor downwardly to the rotatable timing cam,
a second frame, above said timing cam for supporting said first frame for relative vertical displacement,
a mounting plate located vertically above said second frame, and
means for interconnecting said second frame and said mounting plate for relative horizontal displacement transverse to the linear conveyor,
so that said infeed mechanism can be mounted by securing the mounting plate to a machine frame with the infeed mechanism above the linear conveyor.

* * * * *